United States Patent [19]
Mast

[11] Patent Number: 5,626,097
[45] Date of Patent: May 6, 1997

[54] AUTOMATIC ENCLOSURE NEST FOR DOMESTIC FOWL

[75] Inventor: Brian E. Mast, Harrisonburg, Va.

[73] Assignee: Shenandoah Manufacturing Company, Inc., Harrisonburg, Va.

[21] Appl. No.: 542,972

[22] Filed: Oct. 13, 1995

[51] Int. Cl.$^6$ .................................................. A01K 31/16
[52] U.S. Cl. ................................. 119/339; 119/344
[58] Field of Search ................................. 119/343, 342, 119/339, 330, 331, 344, 341

[56] References Cited

U.S. PATENT DOCUMENTS

| | | | |
|---|---|---|---|
| 348,356 | 8/1886 | Spaulding | 119/339 |
| 2,620,589 | 12/1952 | Jones | 119/341 X |
| 2,992,628 | 7/1961 | McDaniel | 119/331 |
| 4,889,076 | 12/1989 | Cohen | 119/339 |
| 5,143,021 | 9/1992 | Shaley | 119/330 |
| 5,222,459 | 6/1993 | Johnson | 119/330 |

FOREIGN PATENT DOCUMENTS

| 423066 | 1/1935 | United Kingdom | 119/339 |
|---|---|---|---|

*Primary Examiner*—Robert P. Swiatek
*Assistant Examiner*—Yvonne R. Abbott
*Attorney, Agent, or Firm*—Nixon & Vanderhye P.C.

[57] ABSTRACT

An automatic enclosure nest for domestic fowl includes automatic controls for controlling the entrance and exit of fowl to and from the nest and for controlling the retrieval of eggs laid by the fowl from the nest. The nest enclosure also includes a trap mechanism that prevents more than one fowl from entering a nest and includes an automatic trap reset mechanism for moving the trap mechanism to an open position after accidental closure of the trap mechanism.

9 Claims, 3 Drawing Sheets

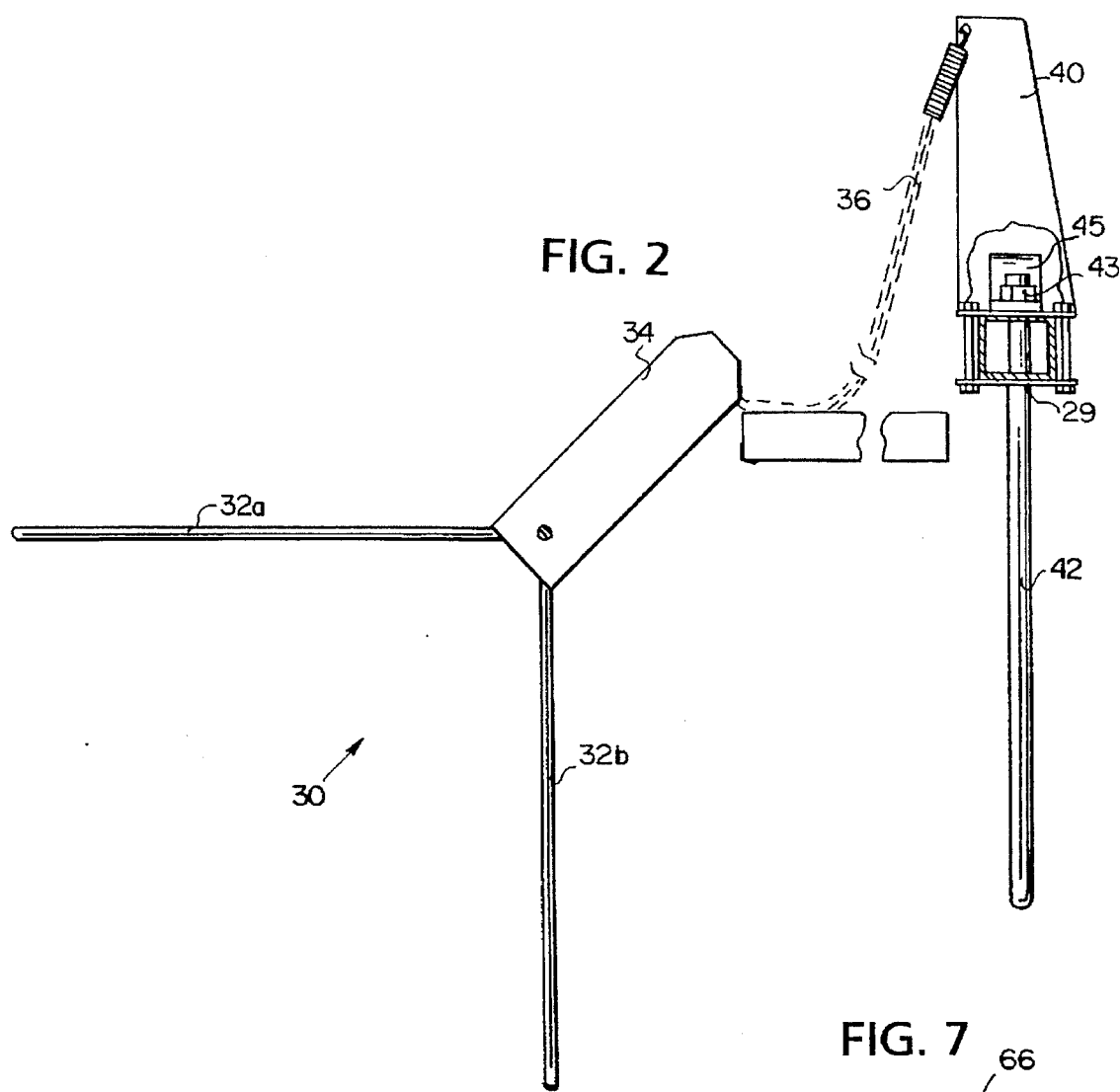
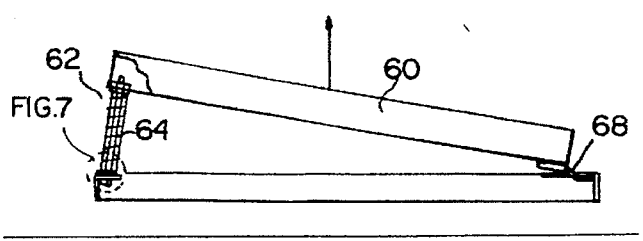
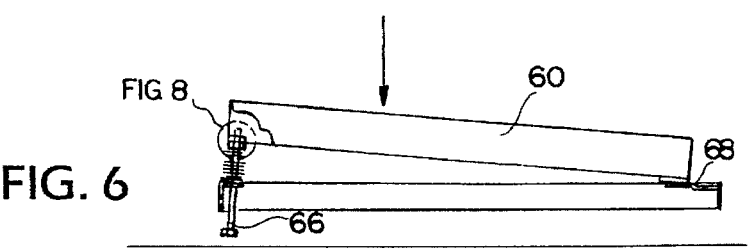
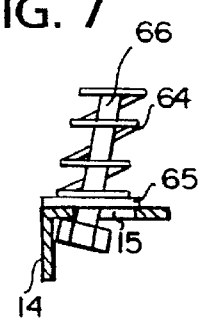
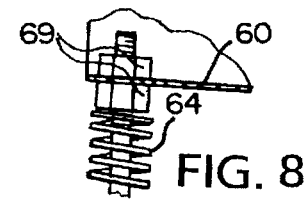

AUTOMATIC ENCLOSURE NEST FOR DOMESTIC FOWL

BACKGROUND OF THE INVENTION

1. Field of the Invention

The present invention relates to enclosures for domestic fowl to encourage the laying of eggs and more particularly to a new and improved automatic enclosure nest for domestic fowl that includes improved automatic controls for controlling the entrance and exit of fowl to and from the nest and for controlling the retrieval of eggs laid by the fowl from the nest.

2. Related Art

Various types of enclosure devices developed to encourage the laying of eggs by domestic fowl are known in the prior art. These include devices such as shown in U.S. Pat. No. 5,143,021 (hereinafter the "'021 patent"), which shows an enclosure nest having a frame with side partitions and continuous joining rails that cooperatively form the enclosure nest and having a fowl entry and exit end and an egg removal end wherein the floor within the nest is movable from an inclined position assumed when the nest is empty to a substantially level position when the fowl enters the nest.

The prior art enclosure nests have had the inherent disadvantages of failing to provide for a means to gently remove the fowl from the nest when desired and of failing to provide an automatic method for resetting a trap mechanism that allows the fowl entry to the nest when the nest is empty and closes behind the fowl when it enters the nest to prevent fowl entry as long as the nest is occupied.

SUMMARY OF THE INVENTION

The general purpose of the present invention is to provide a new and improved automatic enclosure nest for domestic fowl that has all of the advantages of prior art devices of this nature and none of the disadvantages. An object of the present invention is to provide an automatic enclosure nest for fowl having an intermittent expulsion system that allows for the fowls to be slowly and carefully ejected from each of the nests. A further object of the present invention is to provide for a nest having a nest bottom that allows for droppings and other material to fall through the bottom of the nest without the danger of losing eggs. A further object of the present invention is to provide a means for allowing variation in the airflow, openness, and light in the nest. Still another object of the present invention is to provide a means for preventing more than one fowl at a time from entering a nest and to provide a means for automatically resetting the trap mechanism that prevents entry of fowl into a nest when the mechanism is accidentally closed. Still another object of the present invention is to provide a means for allowing the simple removal of a nest bottom for cleaning.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 2 is a side elevation view of a portion of an embodiment of the present invention showing a trap mechanism for controlling the entrance and exit of fowl from a turkey nest, an ejector mechanism, and an automatic reset mechanism for returning the trap mechanism to an open position upon cycling of the ejector mechanism;

FIG. 5 is a side elevation view of the nest bottom in a fully inclined position;

FIG. 6 is a side elevation view of the nest bottom in a partially inclined position;

FIG. 7 is a side elevation view showing an enlarged portion of FIG. 5; and

FIG. 8 is a side elevation view showing an enlarged portion of FIG. 6.

DETAILED DESCRIPTION OF THE PREFERRED EMBODIMENTS

Figure 1:
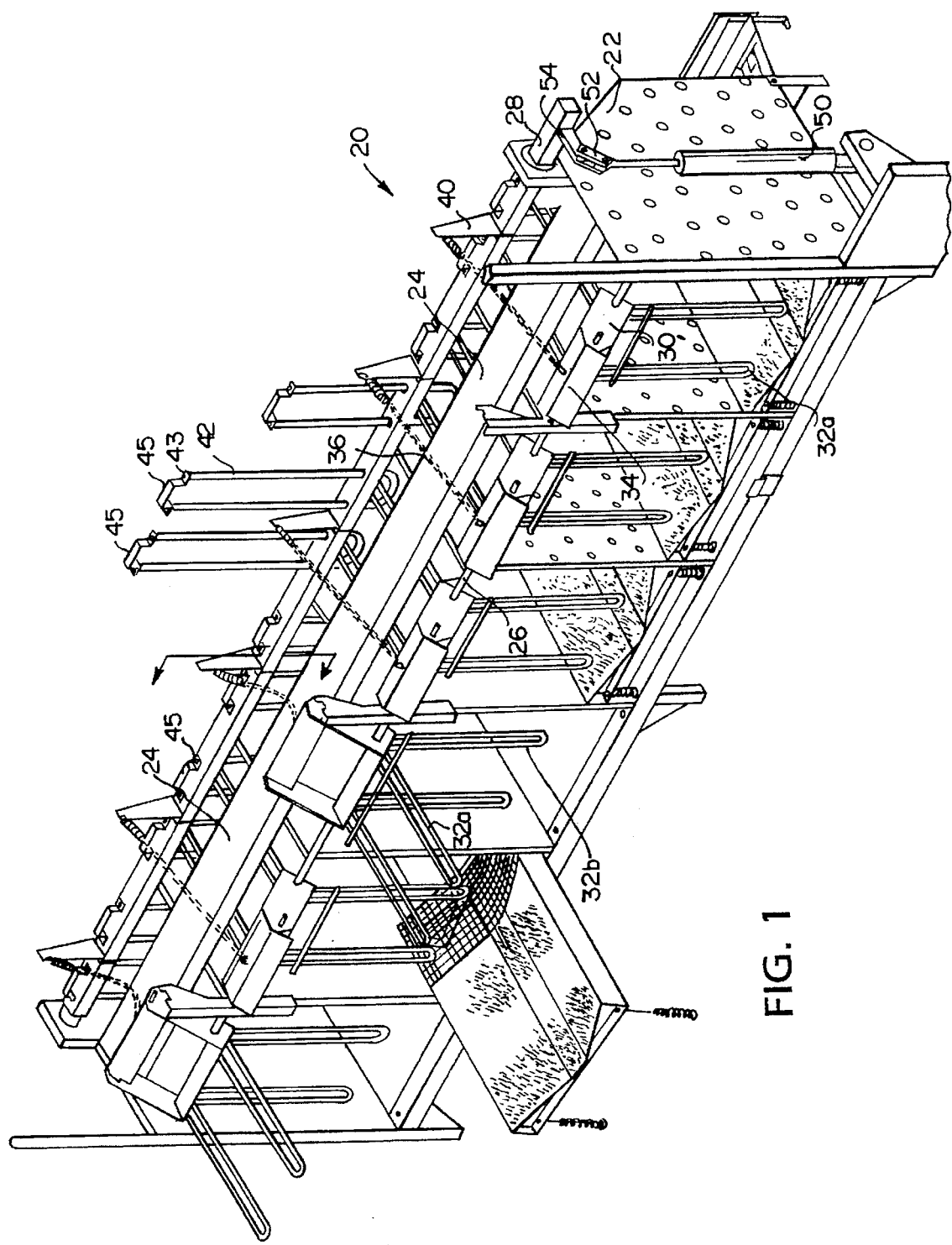
FIG. 1 is a perspective view of a group of automatic enclosure nests for domestic fowl embodying the significant features of the present invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

Referring to the drawings, and in particular to FIG. 1, an automatic enclosure nest according to a preferred embodiment of the present invention is shown generally as 20 and is formed from a plurality of similar individual nest enclosures each having sidewalls 22 and being connected in a row by an overhead beam 24 with a trap mechanism pivot rod 26 and an ejector pivot bar 28 being pivotally supported to the front and rear sides of the central main beam 24, respectively. Pivot rod 26 is located above the front entrance side of each of the nests, and ejector pivot bar 28 is located above the rear exit side of each of the nests. Each nest in the series of nests making up a single section of automatic nest enclosures is provided with a trap mechanism 30 as shown in FIGS. 1 and 2. Each trap mechanism 30 is pivotally supported on pivot rod 26 at the front entrance side to each nest. Trap mechanisms 30 are formed from a plurality of bent rods 32a and 32b, configured as shown in FIGS. 1 and 2. Rods 32a and 32b are affixed to pivot rod 26 along with a counterweight 34. Rods 32a are fastened to pivot rod 26 to form a 90° angle with rods 32b.

Counterweight 34 is fastened to pivot rod 26 and extends in a direction 180° from a line bisecting the 90° angle between bent rods 32a and 32b. The positioning of counterweight 34 in this manner enables trap mechanism 30 to readily move to an open position, wherein bent rods 32b assume a vertical position as a fowl exits the nest, and to a closed position, wherein bent rods 32b assume a horizontal position as a fowl enters the nest. Once a fowl engages bent rod 32a and starts the rotation of trap mechanism 30 about pivot rod 26, the location of counterweight 34 causes trap mechanism 30 to continue to move after the counterweight is moved to either side of a vertical position.

As shown in FIG. 1, each counterweight 34 is connected by a section of chain or cable 36 to an upstanding gusset 40 that is connected to ejector pivot bar 28 at the rear of each nest. The length of each section of cable or chain 36 is predetermined so that when ejector pivot bar 28 is in an idle position as shown in FIGS. 1 and 2, and trap mechanism 30 is in an open position as shown in FIG. 2, chain section 36 will have a degree of slack as shown in FIG. 2. When ejector idle bar 28 is still in an idle position and trap mechanism 30 has been moved to a closed position with front bent rods 32a located in a vertical position, the slack in chain section 36 is removed, as shown in the three right-hand nests of FIG. 1 and the nest in FIG. 1 second from the left. The tautness of chain section 36 when trap mechanism 30 is in a closed position and ejector bar 28 is in an idle position ensures that activation of ejector pivot bar 28 in a clockwise direction as viewed from the right-hand side of FIG. 1, will cause the top side of counterweight 34 to be pulled toward the back side of the nest, thus rotating trap mechanism 30 in a clockwise direction about pivot rod 26 as viewed from the right side of FIG. 1, thereby opening trap mechanism 30. Therefore, the combination of cable or chain section 36 and gusset 40 attached to ejector bar 28 acts as an automatic reset mechanism for trap mechanisms 30. The automatic trap reset mechanisms act to ensure that once a fowl has left the nest and activated trap mechanism 30 to an open position as shown in FIG. 2, if the trap mechanism 30 is accidentally closed, as by the flapping of the wings of a fowl, the automatic reset mechanism will return trap mechanism 30 to an open position upon the next rotation of ejector bar 28.

Ejector bar 28 supports a plurality of U-shaped ejector tubes 42 that are detachably mounted to ejector bar 28 as shown in FIG. 1 and FIG. 2. The ends of ejector tubes 42 are bolted to handle brackets 45 with fasteners 43, as best seen in FIG. 1. Ejector tubes 42 are slidably received in pairs of longitudinally spaced holes 29 through ejector bar 28, and extend downwardly from ejector bar 28 to the back side of each nest. Gravity biases ejector tubes 42 to a lowered position wherein handle brackets 45 rest on the top surface of ejector bar 28, and the close fit between the outer diameter of ejector tubes 42 and holes 29 creates enough friction to hold ejector tubes 42 in this lowered position during operation. However, ejector tubes 42 can be pulled upwardly by handle brackets 43, when desired to provide access to the rear side of each nest, and the friction between ejector tubes 42 and holes 29 maintains ejector tubes in the upper position, as shown in FIG. 1. This adjustable feature of ejector tubes 42 allows for the removal of brooding fowl from the back of the nest if desired. Ejector tubes 42 are dimensioned and positioned such that clockwise rotation of ejector bar 28 causes ejector tubes 42 to follow an arc from the rear of each nest forwardly towards the front of each nest. Ejector tubes 42 and ejector bar 28 thus allow for the ejection of fowl from each of the nests in order to allow for the removal of eggs and to discourage the fowl from sitting on an egg that has been laid.

As shown in FIG. 1, controlled rotation of ejector bar 28 is provided by a linear actuation cylinder 50 that is connected by a pivot arm mechanism 52 to an outstanding lug 54 projecting transversely from an end of ejector bar 28. Extension of the actuation cylinder rod from linear actuation cylinder 50 causes ejector bar 28 to be rotated in a clockwise direction as viewed from the right side of FIG. 1. Extension of linear actuation cylinder 50 can be controlled such that rotation of ejector bar 28 occurs in a gradual, intermittent fashion, thereby allowing for gradual, gentle expulsion of fowl from the nests.

Figure 3:
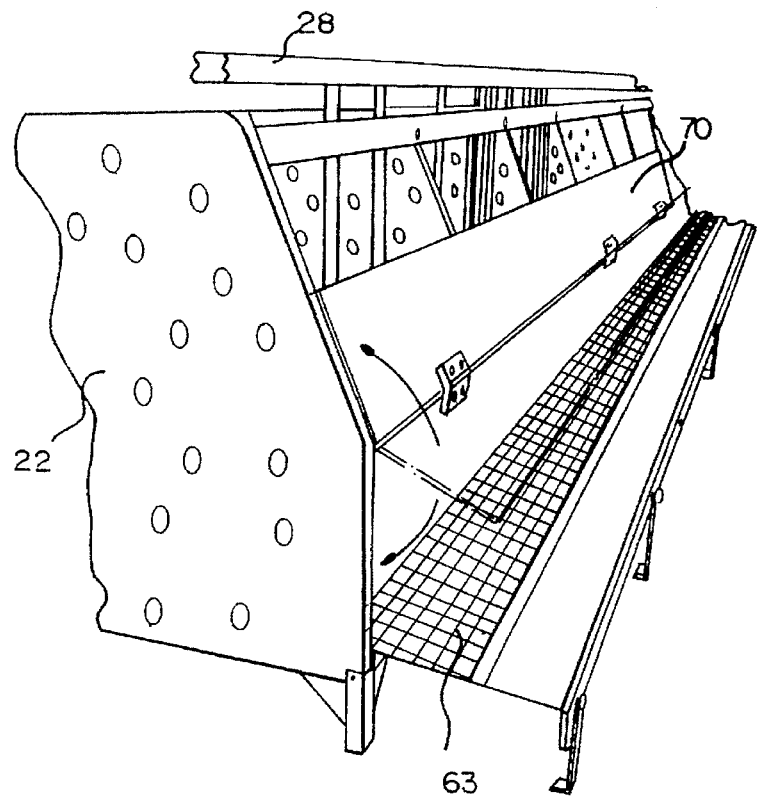
FIG. 3 is a perspective view taken from the back of the automatic enclosure nest showing a means for controlling the openness of each of the nests.

As shown in FIGS. 4–8, a preferred embodiment of a nest bottom 60 for the present invention includes the features of the nest bottom 60 having a number of openings therethrough, including an opening 61 located through the back side of each nest. Opening 61 is covered by a mesh material 63, preferably made from PVC coated 14 gauge wire mesh with approximately 1 inch square openings, that allows debris to fall through the nest bottom while safely retaining eggs laid in the nest. The wire mesh 63 extends beyond the rear side of each nest and provides a surface along which eggs roll to a conveyor located behind the nests, as shown in FIG. 3. A finger pad 67, shown in FIG. 4, made from a pliant material such as an elastomer and having a plurality of upwardly projecting fingers, can be placed over the front portion of the nest bottom in order to provide a comfortable surface for the fowl to lay on.

Each nest bottom 60 is provided with two spring rod assemblies 62 at the front corners of each nest, with spring rod assemblies 62 supporting the front of nest bottoms 60 such that nest bottoms 60 are movable from an inclined position prior to entry of a fowl into the nest to a substantially level position that is assumed once the fowl has entered the nest. Nest bottoms 60 are hingedly connected at their rear edges by Z-shaped brackets 68, shown in FIGS. 5 and 6. The inclination of nest bottom 60 after a fowl leaves the nest causes any eggs that have been laid to roll out of the back side of the nest onto a conveyor as shown in FIG. 3.

Figure 4:
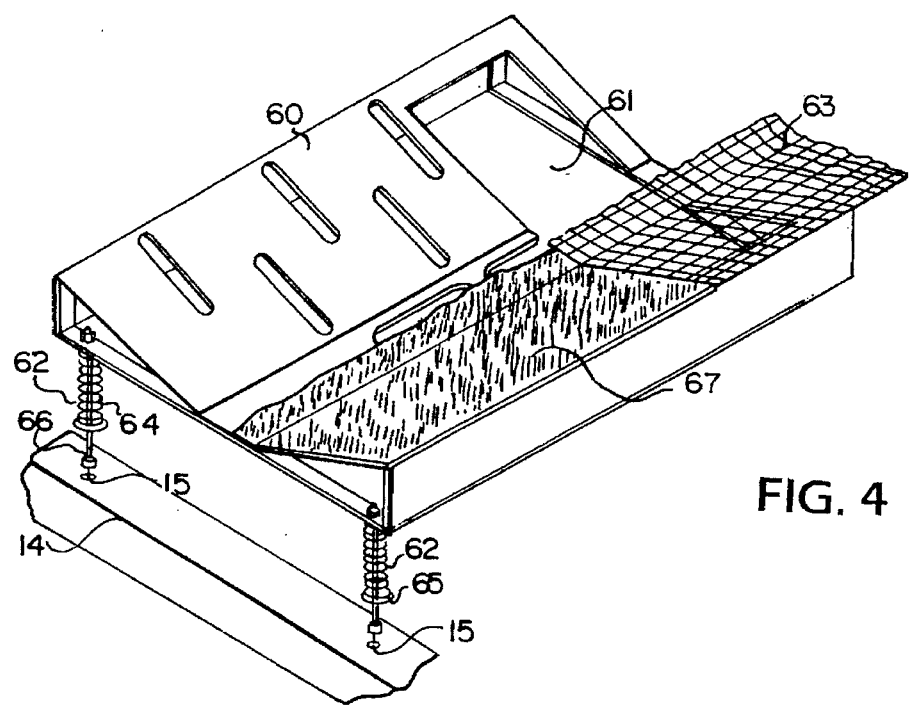
FIG. 4 is a perspective view of a nest bottom showing the openings that allow debris to fall from the nest while safely retaining an egg and showing a spring retention mechanism allowing for the easy removal of the nest bottom.

Each spring rod assembly 62 comprises a spring 64, a central spring guide retention rod 66, and a lower spring washer 65, as shown in FIG. 4. Spring guide retention rod 66 is a standard ¼-20 bolt approximately 6 inches long, with the head of bolt 66 fitting through a hole 15 in a lower frame member 14 of the automatic enclosure nest. Spring washer 65 is placed over the end of bolt 66 and is stopped by the head of bolt 66. A spring 64 is then placed over bolt 66 and rests on spring washer 65. Bolt 66 is connected to the nest bottom 60 by two lock nuts 69, shown in FIG. 8, with one of lock nuts 69 being threaded onto the end of bolt 66 before passing bolt 66 through a hole in nest bottom 60, and the other lock nut 69 being threaded onto bolt 66 to trap nest bottom 60 between the lock nuts. When bolt 66 is attached to nest bottom 60 and the head of bolt 66 is inserted through hole 15 in frame 14, the angle between bolt 66 and frame 14 resulting from the pivoting of nest bottom 60 about Z-shaped brackets 68, causes bolt 66 to be retained in hole 15 as a result of the head of bolt 66 contacting a bottom edge of hole 15, as shown in FIG. 7. Removal of each nest bottom 60 from its associated nest is easily accomplished by raising associated spring washer 65 to compress spring 64, thus allowing for removal of bolt 66 from an associated hole 15 in lower frame member 14, as shown in FIG. 4. Upon removal of bolts 66 from their respective holes in frame member 14, nest bottom 60 can be removed from the nests towards the front side of each nest.

As shown in FIG. 3, a preferred embodiment of the present invention includes the feature of a longitudinal trap door 70 hingedly connected along the back side of a series of nests such that trap door 70 can be pivoted to an upward position against the back side of each nest when it is desired to provide a more closed nest, or pivoted to a downward position when it is desired to provide a more open nest. Pivot door 70 therefore allows for variations in the air flow, openness and light in the nest in order to provide an optimum egg laying environment for the fowl in the nests.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. An automatic enclosure nest for domestic fowl comprising:

a frame including a plurality of side partitions defining therebetween a plurality of nests, with each nest having an entrance side and an exit side;

a trap mechanism positioned at the entrance side of each nest, each of said trap mechanisms having a plurality of bent rods extending across the entrance side of each nest and a counterweight connected to the plurality of bent rods and being pivotally mounted at the entrance of each nest;

an ejector mechanism being pivotally mounted at the exit side of each nest; and an automatic trap reset mechanism being connected between said counterweight and said ejector mechanism such that movement of said ejector mechanism causes movement of said counterweight and said trap mechanism.

2. The enclosure nest of claim 1, wherein the automatic trap reset mechanism comprises a fixed length of flexible chain.

3. The enclosure nest of claim 1, wherein the ejector mechanism includes a linear actuator having means for providing gradual, intermittent extension of said linear actuator, and an ejector bar extending across the exit side of the nests, with the linear actuator being connected to the ejector bar by a pivotal link.

4. The enclosure nest of claim 1, further including a detachably mounted nest bottom, wherein a front edge of the nest bottom is supported by spring assemblies, said spring assemblies including springs and guide members that pass through the springs, the guide members being connected to said nest bottoms and being easily retained by and detached from said frame by compression of said springs for removal of the nest bottom from the nest.

5. The enclosure nest of claim 1, further including a pivotally mounted door extending longitudinally along the exit sides of the nests, wherein said door blocks off a portion of the exit side of each of the nests when in an upper position, and wherein said portions are not blocked off when the door is in a lower position.

6. The enclosure nest of claim 1, wherein said ejector mechanism comprises bent tubes connected to a longitudinally extending ejector pivot bar.

7. The enclosure nest of claim 6, wherein said bent tubes are detachably mounted to said pivot bar.

8. An automatic enclosure nest for domestic fowl comprising:

a frame including a plurality of side partitions defining therebetween a plurality of nests, with each nest having an entrance side and an exit side;

a trap mechanism positioned at the entrance side of each nest, each of said trap mechanisms having a plurality of bent rods extending across the entrance side of each nest and a counterweight connected to the plurality of bent rods and being pivotally mounted at the entrance of each nest;

an ejector mechanism being pivotally mounted at the exit side of each nest;

an automatic trap reset mechanism being connected between said counterweight and said ejector mechanism such that movement of said ejector mechanism causes movement of said counterweight and said trap mechanism;

the automatic trap reset mechanism comprising a fixed length of flexible chain; and the ejector mechanism including a linear actuator having means for providing gradual, intermittent extension of said linear actuator, and an ejector bar extending across the exit side of the nests, with the linear actuator being connected to the ejector bar by a pivotal link.

9. The automatic enclosure nest of claim 8, further including:

a detachably mounted nest bottom, wherein a front edge of the nest bottom is supported by spring assemblies, said spring assemblies including springs and guide members that pass through the springs, the guide members being connected to said nest bottoms and being easily retained by and detached from said frame by compression of said springs for removal of the nest bottom from the nest.

* * * * *